(12) United States Patent
Ballinger et al.

(10) Patent No.: US 6,511,135 B2
(45) Date of Patent: Jan. 28, 2003

(54) DISK BRAKE MOUNTING BRACKET AND HIGH GAIN TORQUE SENSOR

(75) Inventors: Robert S. Ballinger, West Chester, OH (US); Robert J. Disser, Dayton, OH (US); David B. Drennen, Bellbrook, OH (US); Thomas D. Hewer, Dayton, OH (US); Gregory M. Hickey, Bellbrook, OH (US); Harald Klode, Centerville, OH (US); Patrick A. Mescher, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/735,135

(22) Filed: Dec. 12, 2000

(65) Prior Publication Data

US 2001/0032757 A1 Oct. 25, 2001

Related U.S. Application Data

(60) Provisional application No. 60/170,563, filed on Dec. 14, 1999.

(51) Int. Cl.⁷ .................................................. B60T 8/00
(52) U.S. Cl. .................................... 303/112; 303/20
(58) Field of Search .............................. 303/15, 3, 20, 303/166, 112; 73/862.627, 775

(56) References Cited

U.S. PATENT DOCUMENTS

| | | | | |
|---|---|---|---|---|
| 3,782,185 A | * | 1/1974 | Hassanauer et al. | 73/121 |
| 4,016,755 A | * | 4/1977 | Anderberg et al. | 73/121 |
| 4,679,668 A | * | 7/1987 | Washizu et al. | 188/353 |
| 4,716,994 A | * | 1/1988 | Iwamoto | 188/72.2 |
| 4,719,796 A | * | 1/1988 | Zenker | 73/121 |
| 5,003,829 A | * | 4/1991 | DeConti et al. | 73/862.12 |
| 5,035,295 A | * | 7/1991 | Leiber et al. | 188/140 |
| 5,279,394 A | * | 1/1994 | Wollenweber et al. | 188/1.11 |
| 5,417,482 A | * | 5/1995 | Kashima et al. | 303/112 |
| 5,522,270 A | * | 6/1996 | Gissinger et al. | 73/862.627 |
| 5,970,427 A | * | 10/1999 | Greenwald | 702/33 |
| 5,979,995 A | * | 11/1999 | Miyazaki | 303/112 |
| 6,008,604 A | * | 12/1999 | Maisch | 318/362 |
| 6,059,379 A | * | 5/2000 | Deml et al. | 303/15 |
| 6,098,760 A | * | 8/2000 | Seils | 188/1.11 E |
| 6,182,516 B1 | * | 2/2001 | Kowalcyk | 73/862.12 |
| 6,230,854 B1 | * | 5/2001 | Schwarz et al. | 188/156 |

\* cited by examiner

Primary Examiner—Pam Rodriguez
Assistant Examiner—Benjamin A Pezzlo
(74) Attorney, Agent, or Firm—Scott A. McBain

(57) ABSTRACT

A mounting bracket apparatus for a disc brake of a vehicle is provided for measuring torque in a disc brake mounting bracket. The invention includes a bracket capable of being secured to a non-rotatable part of a vehicle. The bracket includes first and second caliper bracket abutments and a cross member extending in the direction of the rotational axis of the disc. The cross member joins the first and second caliper bracket abutments at respective first and second corner-shaped portions. A force sensor is located adjacent the first corner-shaped portion of the bracket adapted to sense strain in the first corner-shaped portion.

24 Claims, 3 Drawing Sheets

DISK BRAKE MOUNTING BRACKET AND HIGH GAIN TORQUE SENSOR

This application claims the benefit of Ser. No. 60/170,563, filed Dec. 14, 1999.

TECHNICAL FIELD

The technical field of this disclosure is disc brakes for vehicles and particularly a torque sensor for a disc brake mounting bracket.

BACKGROUND OF THE INVENTION

Current design practice with regard to hydraulic brake apply systems is to measure brake torque by using a hydraulic pressure transducer and wheel speed sensor to estimate wheel brake torque. In addition to a measured velocity of a rotor in a brake system, torque values are used in Antilock Brake Systems (ABS) in an algorithm to control operation of the braking system. The accuracy of the actual brake torque is critical to intelligent brake control of ABS or other braking systems. Brake pressure or normal loading to the rotor, however, cannot be accurately used to measure torque due to the variation of coefficient of friction produced between various brake pads (0.1 dry hard to 0.4 wet soft) and rotor cheeks.

Therefore, it would be beneficial to provide an apparatus for accurately measuring torque in a brake system.

SUMMARY OF THE INVENTION

One aspect of the present invention provides a mounting bracket apparatus for a disc brake of a vehicle including a bracket capable of being secured to a non-rotatable part of a vehicle, the bracket including first and second caliper bracket abutments and a cross member extending in the direction of the rotational axis of the disc, the cross member joining the first and second caliper bracket abutments at respective first and second corner-shaped portions and a force sensor located adjacent to the first corner-shaped portion of the bracket adapted to sense strain in the first corner-shaped portion.

Other aspects include a mounting bracket apparatus wherein the force sensor can be a strain gage. The bracket can include, in the first corner-shaped portion, a void. The void can be a cylindrical void or a rectangular void. The first corner-shaped portion can include a tapered cross-sectional portion. The corner-shaped portion can taper toward the outer edge of the corner-shaped portion. The tapered cross-sectional portion can include a void. The void may be a cylindrical or rectangular void.

In other aspects of the invention the force sensor can include a load cell formed integrally into the tapered portion of the first corner-shaped portion. The sensor can be attached to an outer surface of the bracket across the first corner-shaped portion. The force sensor can be attached in a slot in the bracket across the first corner-shaped portion. The force sensor can be attached to a sensor bracket across the first corner-shaped portion. The sensor bracket can include a first end attached to the first caliper bracket abutment and a second end attached to the cross-member. The sensor bracket can taper towards an outer edge of a sensor-mounting portion of the sensor bracket. The sensor bracket can include at least one void. The sensor bracket can include a plurality of voids. The plurality of voids causes amplification of the strain in the first bracket abutment. The mounting bracket apparatus includes a first caliper bracket abutment adapted to receive a brake force.

Another aspect of the present invention provides a method of measuring torque in a disc brake mounting bracket including applying a brake force to the disc brake mounting bracket, amplifying strain at an outer portion of the disc brake mounting bracket, sensing strain adjacent the outer portion of the disc brake mounting bracket and generating a signal to send to a disc brake control system. In other aspects of the method of the invention the outer portion can be a predetermined tapered portion of the bracket and the outer portion can include a void formed therein.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
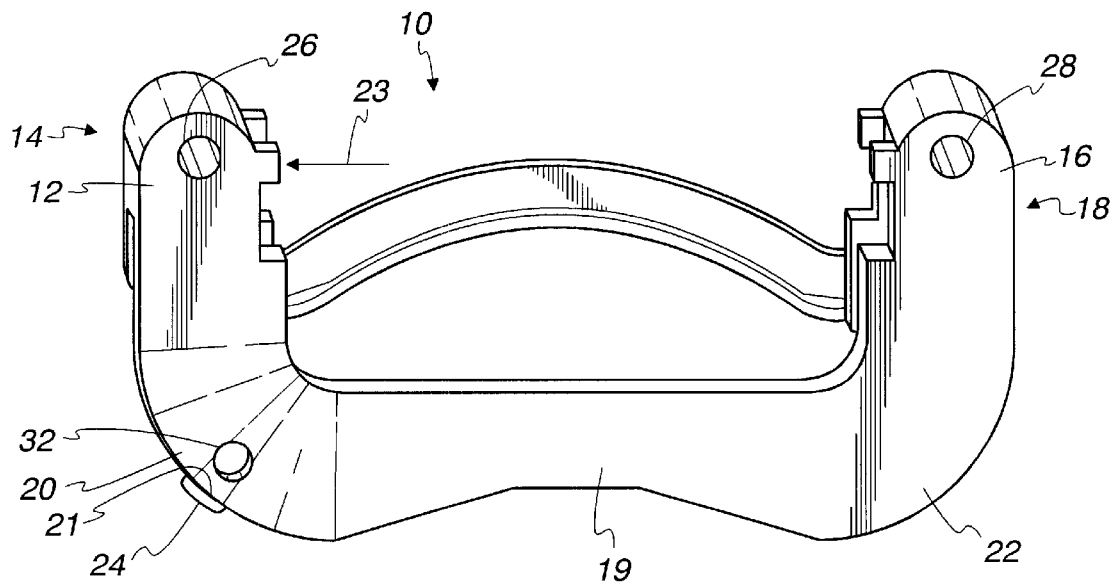
FIG. 1 shows an embodiment of the disc brake mounting bracket of the present invention in a front perspective view.
Figure 2:
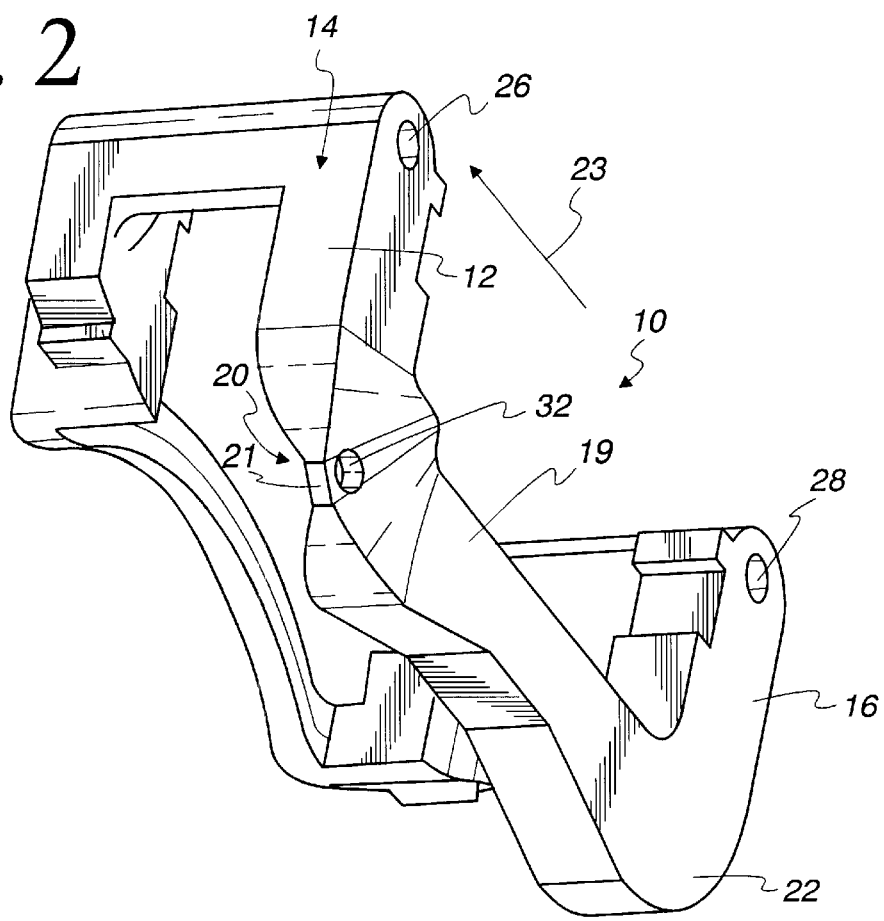
FIG. 2 shows the disc brake mounting bracket of FIG. 1 from a bottom perspective view to illustrate the tapered cross-section.
Figure 3:
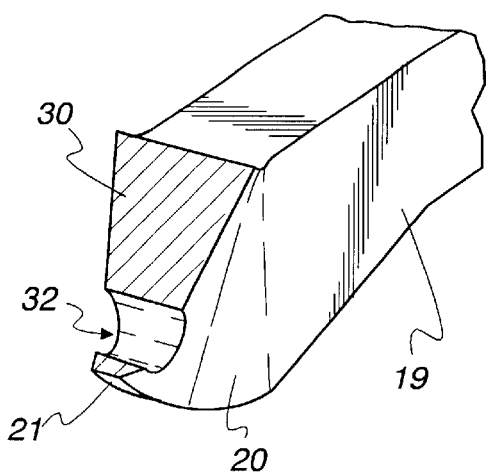
FIG. 3 shows a close up, enlarged, cross-sectional view of the tapered cross-section and void of FIGS. 1 and 2.
Figure 4:
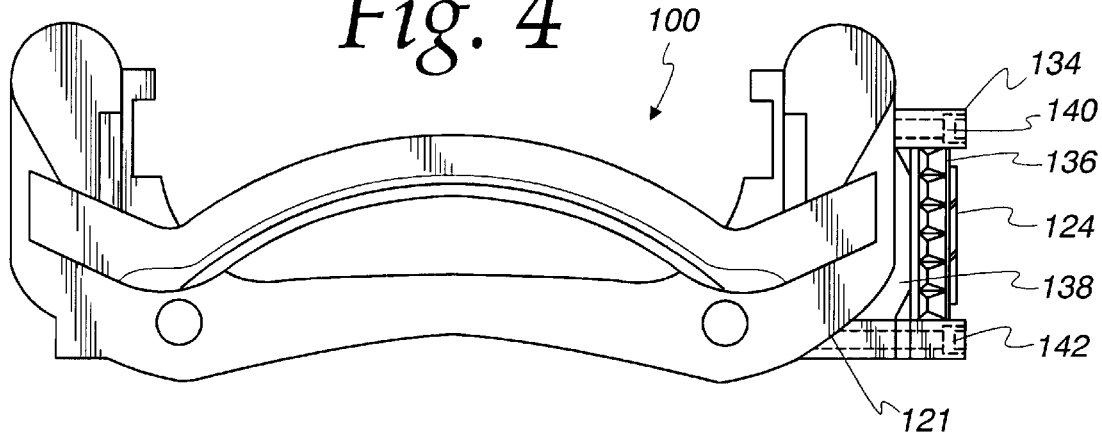
FIG. 4 shows the disc brake mounting bracket of FIG. 1 in a rear view with a force sensor-mounting bracket attached thereto.

Referring to FIGS. 1–3, one embodiment of a disc brake caliper-mounting bracket is generally shown at 10. The bracket 10 includes a first caliper bracket abutment or leg 12 located at one end of the bracket 10 at a leading edge 14 of the bracket. A second caliper abutment or leg 16 is located at the other end of the bracket 10 at a trailing edge 18 opposite the first caliper abutment 12. The first and second abutments 12, 16 are joined together by a substantially straight cross member 19. The first abutment 12 is joined to the cross member 19 at a first corner-shaped portion 20 of the bracket 10. The second abutment 16 is joined to the cross member 18 at a second corner-shaped portion 22 of the bracket 10.

The braking force is applied in reaction against leg or abutment 12 outwardly as shown by arrow 23 in FIG. 1. Therefore, an outside portion 21 of corner-shaped portion 20 is urged into compression by the braking force 23.

One embodiment of the invention applied a force sensor 24 or strain sensor directly to the corner 20 to measure the actual brake-apply torque. The sensor can be a load cell, piezoelectric sensor, strain gage, or the like, adapted to generate a signal related to the, strain in the bracket 10. The force sensor 24 can be strategically located on the outer surface 21 of the corner 20 where leg or abutment 12 joins cross-member 19. The corner 20 is an area where compression (or tension) strain exists. In operation, the bracket abutment 12 deflects due to the brake tangential force of the brake shoe (not shown) acting on the bracket abutment 12 (or pins in the pin bores 26, 28). Force sensor 24 can measure the compression strain (or tension strain) on the bracket abutment 12.

Sensitivity of the measurement is increased by magnifying the magnitude of the compressive strain by a unique portion of the bracket designed such that the magnitude of the compressive strain approaches the magnitude of the tensile strain (on the other side of the bracket abutment). This can be accomplished by utilizing a tapered bracket abutment cross-section generally shown at 30, such that the neutral axis (bending stress) of the cross-section is translated or shifted away from the outer surface 21, thereby amplifying the strain at the surface. The amplification can by further increased or enhanced by including a void or hole 32 in the corner 20 adjacent the surface 21, thereby shifting the neutral axis even further from the location of the sensor 24.

It will be understood that the sensor 24 can either be attached to the surface 21 of the bracket 10 or embedded in a slot (not shown) in the bracket 10 or other known fastening methods. In another embodiment, the sensor 124 can be attached to a sensor bracket 134 fastened to the outer surface 121 of the bracket 100, as shown in FIGS. 4–7. As in the previous embodiment, the bracket 100 includes first and second legs 112, 116 joined by cross-member 119. The sensor bracket 134 can be attached to the bracket 100 adjacent caliper bracket abutment 112 using fasteners 140, 142. The sensor can have a tapered structure (like that of the bracket 10 at corner 20 of FIG. 2) thus concentrating the strain at the outer sensor-mounting portion 136 of the sensor bracket 134. The structure of the sensor bracket 134 can be C-shaped thereby creating at least one void 138 when the C-shaped sensor bracket 134 is attached to the bracket 100.

In operation, referring to FIG. 1, the bracket is mounted to a non-rotating part of a vehicle and carries a brake caliper. As the brakes are applied, the calipers (not shown) apply a brake force to the abutment 12 of the disc brake mounting bracket 10 in direction 23. The brake force causes a change in the dimensions of the bracket 10, and in particular, can cause compression in the outer portion 21 of the corner 20. On the inside of the corner 20 the same brake force can cause tension. A force sensor 24 senses the resulting strain of the compressive and tensile forces. The narrow cross-section of the bracket at 21 and the void 32 allow the bracket to deform more at the surface 21 than other portions of the bracket, which effectively amplifies the strain in the bracket at surface 21. The sensor 24 produces a signal corresponding to the strain. The signal is used by a vehicle brake control system (not shown) to control the braking of the vehicle.

Figure 5:
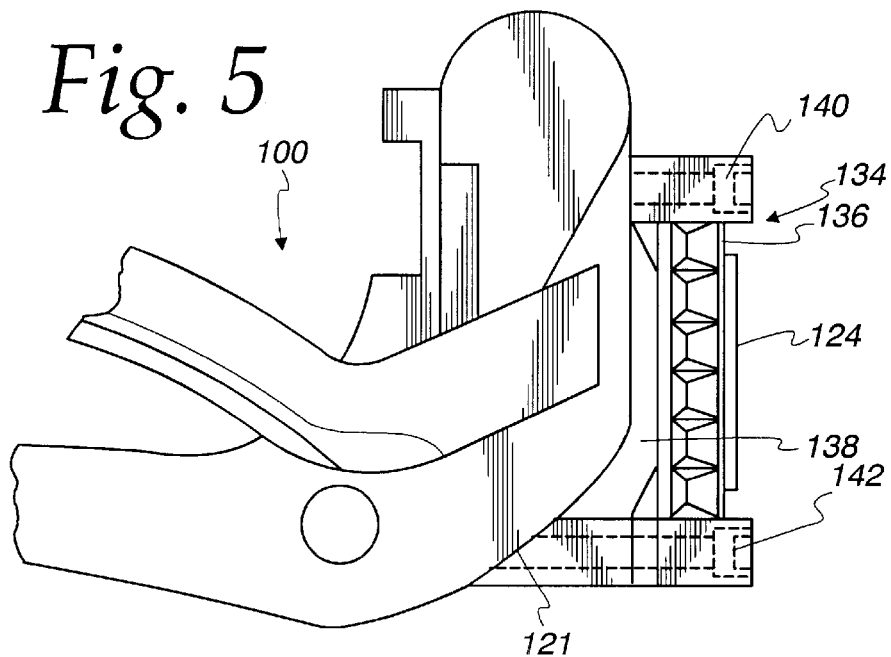
FIG. 5 shows the disc brake mounting bracket of FIG. 4 in a close up rear view.
Figure 6:
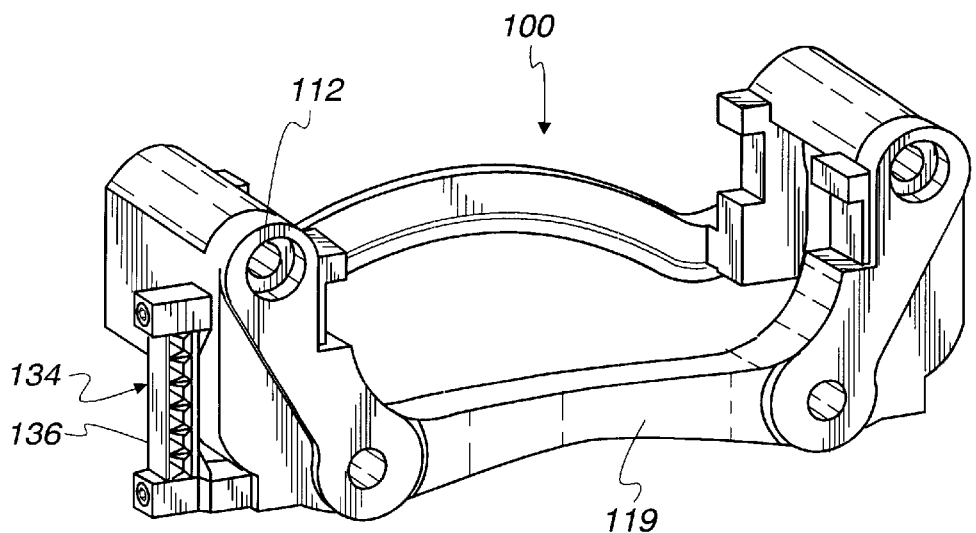
FIG. 6 shows another embodiment of the disc brake mounting bracket of the present invention in a front perspective view with a force sensor mounting bracket attached thereto.
Figure 7:
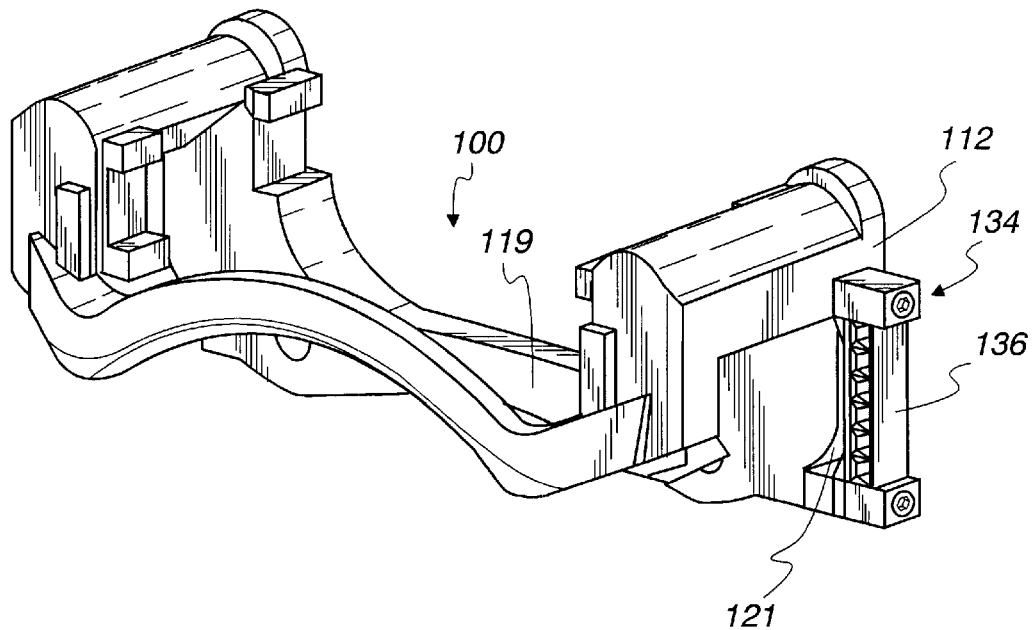
FIG. 7 shows the disc brake mounting bracket of FIG. 6 in a rear perspective view.

With reference to FIG. 5, as the bracket 100 has a brake force applied thereto (as in the bracket 10 of FIG. 1) the sensor 124 directly measures brake tangential reaction force through its resulting strain in sensor bracket 134. The strain is amplified by the taper of the sensor bracket 134 structure narrowing toward the sensor-mounting portion 136 and, if used, the void 138.

The embodiments of the apparatus shown can provide the following advantages: (1) the sensor, as a result of the direct contact with the strain in the bracket provides more accurate information for brake control; (2) the sensor is not located in a direct load path and thus, does not affect caliper response time as a compliant force sensor would; (3) the addition of the sensor does not increase caliper package size in a prohibited direction; (4) the apparatus can be applied to hydraulic caliper designs instead of measuring pressure; (5) and the apparatus could include a device for continuous monitoring of caliper service using two sensors, i.e., lead and trail.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A mounting bracket apparatus for a vehicle comprising:

a bracket capable of being secured to a non-rotatable part of a vehicle, the bracket including first and second caliper bracket abutments and a cross member extending in the direction of the rotational axis of a disc, the cross member joining the first and second caliper bracket abutments at respective first and second corner-shaped portions; and a force sensor located adjacent the first corner-shaped portion of the bracket adapted to sense strain in the first corner-shaped portion, wherein the thickness of the first caliper bracket abutment tapers towards the first corner-shaped portion.

2. The mounting bracket apparatus of claim 1 wherein the force sensor includes a strain gage.

3. The mounting bracket apparatus of claim 1 wherein the first corner-shaped portion includes a void.

4. The mounting bracket apparatus of claim 3 wherein the void is a cylindrical void.

5. The mounting bracket apparatus of claim 3 wherein the void is a rectangular void.

6. The mounting bracket apparatus of claim 1 wherein the first corner-shaped portion includes a tapered cross-sectional portion.

7. The mounting bracket apparatus of claim 1 wherein the corner-shaped portion tapers toward the outer edge of the corner-shaped portion.

8. The mounting bracket apparatus of claim 7 wherein the tapered cross-sectional portion includes a void.

9. The mounting bracket apparatus of claim 8 wherein the void is a cylindrical void.

10. The mounting bracket apparatus of claim 8 wherein the void is a rectangular void.

11. The mounting bracket apparatus of claim 7 wherein the force sensor includes a load cell formed integrally into the tapered portion of the first corner-shaped portion.

12. The mounting bracket apparatus of claim 1 wherein the force sensor is attached to an outer surface of the bracket across the first corner shaped portion.

13. The mounting bracket apparatus of claim 1 wherein the force sensor is attached in a slot in the bracket across the first corner-shaped portion.

14. The mounting bracket apparatus of claim 1 further comprising a sensor bracket, the sensor bracket attached to the bracket across the first corner-shaped portion, wherein the force sensor is attached to the sensor bracket.

15. The mounting bracket apparatus of claim 14 wherein the sensor bracket includes a first end attached to the first caliper bracket abutment and a second end attached to the cross-member.

16. The mounting bracket apparatus of claim 14 wherein the sensor bracket includes at least one void.

17. A method of measuring torque in a disc brake mounting bracket comprising:
   applying a brake force to the disc brake mounting bracket;
   amplifying strain at an outer portion of the disc brake mounting bracket;
   sensing strain adjacent the outer portion of the disc brake mounting bracket; and
   generating a signal to send to a disc brake control system,
   wherein the disc brake mounting bracket includes a first bracket abutment having a thickness that tapers towards a first corner portion of the disc brake mounting bracket.

18. The method of claim 17 wherein the outer portion is a predetermined tapered portion of the bracket.

19. The method of claim 18 wherein the outer portion includes a void formed therein.

20. A disc brake mounting bracket apparatus for a vehicle comprising:
   means for applying a brake force to the disc brake mounting bracket;
   means for amplifying strain at an outer portion of the disc brake mounting bracket;
   means for sensing strain adjacent the outer portion of the disc brake mounting bracket; and
   means for generating a signal to send to a disc brake control system, wherein the disc brake mounting bracket includes a first bracket abutment having a thickness that tapers towards a first corner portion of the disc brake mounting bracket.

21. The apparatus of claim 20 wherein the outer portion is a predetermined tapered portion of the bracket.

22. The apparatus of claim 21 wherein the outer portion includes a void formed therein.

23. A mounting bracket apparatus for a vehicle comprising:
   a bracket capable of being secured to a non-rotatable part of a vehicle, the bracket including first and second caliper bracket abutments and a cross member extending in the direction of the rotational axis of a disc, the cross member joining the first and second caliper bracket abutments at respective first and second corner-shaped portions, the first corner-shaped portion including a cylindrical void; and
   a force sensor located adjacent the first corner-shaped portion of the bracket adapted to sense strain in the first corner-shaped portion.

24. A mounting bracket apparatus for a vehicle comprising:
   a bracket capable of being secured to a non-rotatable part of a vehicle, the bracket including first and second caliper bracket abutments and a cross member extending in the direction of the rotational axis of a disc, the cross member joining the first and second caliper bracket abutments at respective first and second corner-shaped portions; and
   a force sensor located adjacent the first corner-shaped portion of the bracket adapted to sense strain in the first corner-shaped portion,
   wherein the corner-shaped portion tapers toward the outer edge of the corner-shaped portion, and
   wherein the tapered corner-shaped portion includes a cylindrical void.

* * * * *